United States Patent Office 3,113,218
Patented Dec. 3, 1963

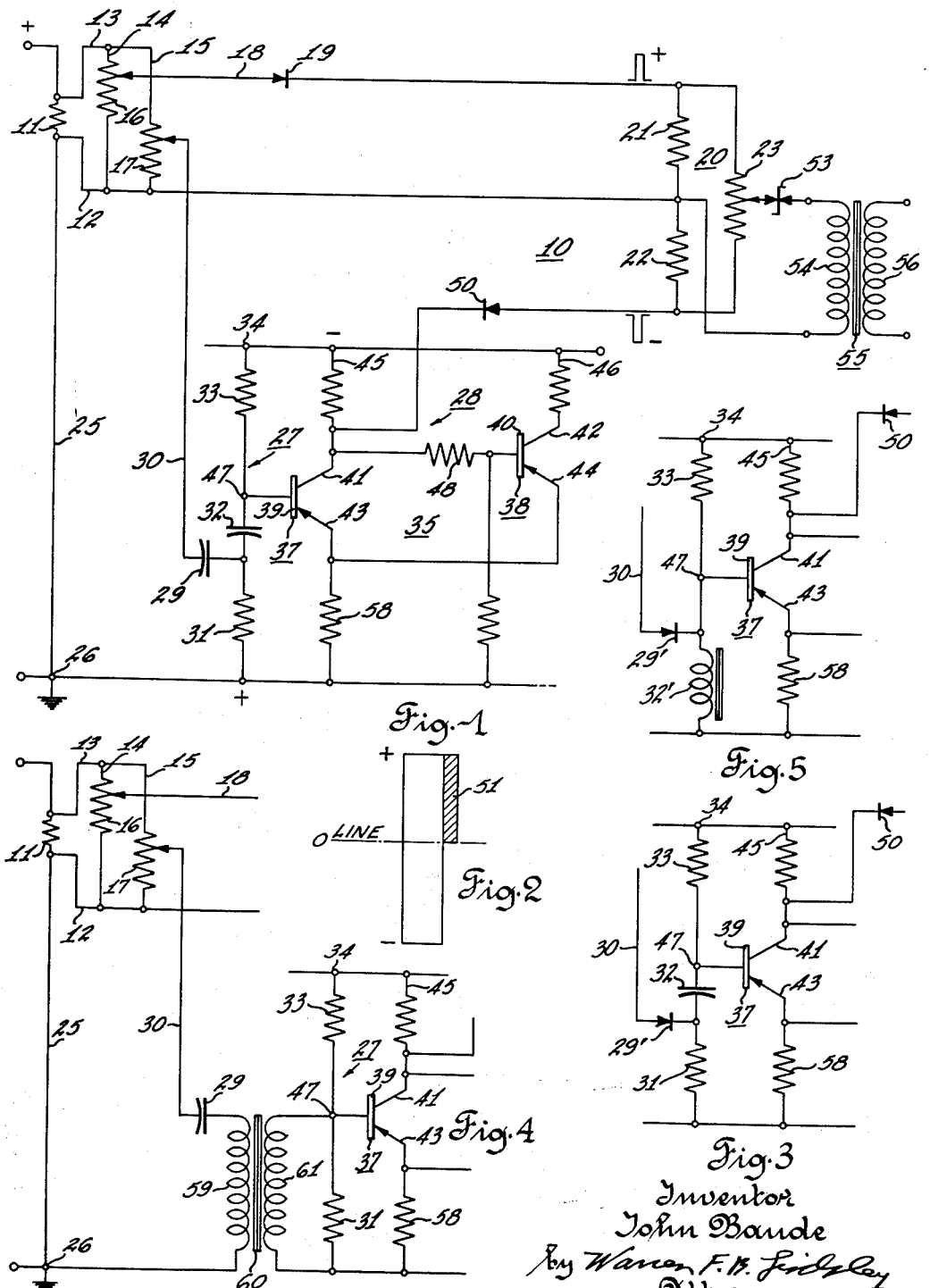

3,113,218
PULSE WIDTH DISCRIMINATOR
John Baude, Milwaukee, Wis., assignor to Allis-Chalmers
Manufacturing Company, Milwaukee, Wis.
Filed May 13, 1959, Ser. No. 813,027
5 Claims. (Cl. 307—88.5)

This invention relates to circuits responsive to pulse shapes and more particularly to coincidence type pulse width discriminators.

The circuits disclosed are provided for detecting the variations of a pulse shape from a reference pulse shape and may be used alone or in combination with pulse amplitude discriminating circuits.

In accordance with the invention claimed a new and improved measuring circuit is provided which is responsive to variations in the shapes of electrical pulses received from a source. Means are provided for transmitting these pulses along a plurality of channels. A pulse shaping circuit is connected to one of the channels and comprises a shaping element and a phase inverting circuit element. Means are provided for detecting a variation in the shape of pulses fed to it. The output of the pulse shaping circuit is connected to the pulse shape detecting means for providing a reference pulse shape and the output of another one of the channels is fed to the pulse detecting means for providing the source of measurable pulses. The pulse shape detecting means emits a signal pulse the shape of which is equivalent to the difference in shape of the reference pulses and the measurable pulses.

It is, therefore, one object of this invention to provide a new pulse shape detector.

Another object of this invention is to provide a new and improved coincidence type pulse shape detecting circuit.

A further object of this invention is to provide a new and improved circuit for comparing the shapes of a plurality of pulses received simultaneously and emitting a signal pulse which is equivalent to the difference in shapes of the simultaneously measured pulses.

Objects and advantages other than those set forth will be apparent from the following description when read in connection with the accompanying drawing, in which:

FIG. 1 is a schematic view of a coincidence type pulse shape detecting means embodying the invention;

FIG. 2 is a graphical illustration of the pulse reference, measurable pulse and difference in pulse width of the reference and measurable pulses; and FIGS. 3, 4 and 5 are partial schematic views of modifications of the circuit illustrated in FIG. 1 embodying the invention.

Referring more particularly to the drawing wherein like parts are designated by like characters of reference throughout the figures, FIG. 1 illustrates a pulse shape discriminating circuit 10 which may be, for example, utilized for triggering a high speed circuit breaker tripping mechanism (not shown). In the circuit illustrated the pulse shape discriminating arrangement may be utilized for detecting a variation in current pulses taken from a shunt 11 which may be arranged across any source of pulse supply such as, for example, a klystron tube. The klystron tube is a transmitting mechanism which may be triggered thirty times a second and is usually capable of carrying thirty ampere square shaped current pulses. This type of tube is readily destroyed if subjected to current pulses of an amplitude greater than its rating and in view of its cost must be accurately controlled. In view of the fact that the pulse shape is usually an indication of possible pulse amplitude variation, the pulse shape is an important current or voltage characteristic to measure and control. Therefore, the claimed invention was conceived to detect a pulse shape variation and to emit a signal pulse the value of which varies with the difference in measured pulse shape from a reference pulse. This signal pulse may be used to trigger a high speed electronic trip mechanism into conduction and this action trips a circuit breaker controlling the equipment protected such as, for example, the klystron tube. In view of the fact that the use of the signal pulse, which is the resultant of the difference in shapes of a reference pulse and a measurable pulse, may be utilized in many different ways without having any effect on the claimed subject matter, the detail structure of the controlled equipment is not shown in the drawing.

A voltage signal, which may be either positive or negative pulses from shunt 11 connected to, for example, the klystron tube (not shown), is transmitted by means of a pair of shielded cables 12 and 13 to a plurality of channels 14 and 15. In the drawing, pulses from shunt 11 are fed into or across a differential network comprising a pair of parallelly arranged potentiometers 16 and 17 arranged in channels 14 and 15, respectively. The potentiometers may comprise any suitable rheostat or impedance arrangement which is adjusted to decrease the pulse intensity to the desired level.

Pulses fed to potentiometers 16 are transmitted through conductor 18 and diode 19 into a differential circuit 20 comprising resistance elements 21 and 22 and a potentiometer 23. Resistance elements 21 and 22 are connected in shunt across potentiometer 23 with the common connection between resistance elements 21 and 22 being connected to cable 12, shunt 11, conductor 25 to a ground connection 26. The signal pulse which is transmitted to diode 19 is imposed upon resistance element 21 and the instantaneous voltage drop across element 21 is compared with the instantaneous voltage drop across resistance element 22 which is the result of the same pulse but modified by a pulse controlling or shaping circuit 35. This pulse controlling or shaping circuit comprises a shaping portion 27 and a phase inverting portion 28.

The same pulse transmitted by shunt 11 and cables 12 and 13 fed to potentiometer 16 is also imposed upon potentiometer 17. This pulse is transmitted from potentiometer 17 to a suitable capacitor 29 through conductor 30. Capacitor 29 may be replaced by a suitable diode 29' (shown in FIG. 3). Capacitor 29 transmits the pulses across a resistance element 31. Resistance element 31 connected in series with a capacitance element 32 and a resistance element 33 across a source of potential 34 comprises the pulse shaping portion 27. The source of potential 34 may comprise a direct current potetnial comprising ground 26 and a suitable negative voltage value extending below ground potential. The potential of a given point in the shaping portion 27 of circuit 35 is used for triggering a monostable circuit comprising at least a part of the phase inverting adjustable time delay circuit portion 28.

This known monostable circuit comprises a pair of PNP type transistors 37 and 38 comprising bases 39 and 40, collectors 41 and 42 and emitters 43 and 44, respectively. The emitters and collectors of each transistor are connected in different series circuits 45 and 46 across the direct current source 26, 34. Base 39 of transistor 37 is conductively connected to shaping portion 27 at point 47. Base 40 of transistor 38 is conductively connected through a resistor 48 to the collector 41 of transistor 37.

The pulse emitted by shunt 11 which is herein shown as being of positive polarity is imposed upon potentiometers 16 and 17. The pulse from potentiometer 17 is transmitted to the capacitance element 29 across resistance element 31. The normally conductive transistor 37 is triggered into cutoff by making its base 39 more positive than its emitter 43. The duration of the pulse from potentiometer 17 depends upon the RC time characteristics of the circuit to which it is connected, namely, the values of capacitance element 32 and resistance elements 31 and 33. In this manner, the length of time during which the base of transistor 37 is more positive than the emitter once it has been triggered into cutoff depends entirely upon the circuit constants, namely, elements 31, 32 and 33 and not upon the duration of the original triggering pulse which has been sent out by shunt 11. By rendering transistor 37 nonconductive it triggers transistor 38 in the known manner and this monostable circuit now emits a negative pulse of definite and predetermined shape and duration through a diode 50 into the other side of the differential circuit 20 and imposes this signal across potentiometer 23.

As graphically shown in FIG. 2 diode 19 conducts a positive current pulse of unknown duration to the differential circuit 20 while diode 50 conducts a negative current pulse of a known duration (due to the function of the monostable circuit and the time constant of the circuit elements 31, 32 and 33) to the differential circuit 20. These two pulses are compared with each other in the differential circuit 20 and if there is a residual pulse remaining such as shown by the shaded area 51 of FIG. 2 this residual or signal pulse is transmitted from potentiometer 23 through a suitable diode 53 which may be a Zener diode to the primary winding 54 of a transformer 55. The secondary winding 56 of transformer 55 may be used, for example, to energize an electronic tripping mechanism for a circuit breaker (not shown) either directly or through a power amplifier.

In FIG. 1 of the drawing the Zener diode 53 is shown as a double anode diode which will function on a positive as well as negative residual pulse. This type of diode is a nonlinear voltage limiting breakdown device. If a discrimination between the polarity of the residual pulses is required the double anode diode 53 may be replaced by a single anode Zener diode in series with an ordinary diode arranged in such a manner that unwanted pulses are blocked by the additional diode. The Zener diode 53 also may be relaced by an ordinary diode in which case consideration of the amplitude of the pulses is disregarded.

If further temperature stabilization is required resistor 58 may be replaced by a thermistor with a proper temperature constant or a diode may be connected from the base of transistor 37 to ground in such a manner that at high temperatures the increase of the reverse current through this diode would compensate for the increased leakage current of transistor 37.

FIG. 3 illustrates a modification of the circuit shown in FIG. 1 wherein capacitor 29 is replaced by suitable diode 29'. Diode 29' transmits the pulses across resistance element 31 in the same general manner as explained in the description of FIG. 1.

FIG. 4 illustrates a modification of the circuit shown in FIG. 1 wherein the primary winding 59 of a pulsing transformer 60 is fed directly from the capacitance element 29 and is connected between element 29 and ground 26. The secondary winding 61 of transformer 60 replaces the timing capacitance element 32 and is connected to point 47 in shaping portion 27 of the shaping circuit 35 and across resistance element 31 to the positive side of direct current source 34. This circuit operates in the same general manner as explained for the circuit shown in FIG. 1.

FIG. 5 shows a variation of the pulse shaping portion of the circuit 35 wherein circuit element 32 of FIG. 1 has been replaced by an inductance 32'. Resistor 31 was omitted because of the internal resistance of device 32'. The diode 29' replaces capacitor 29 of FIG. 1. The operation of this circuit is similar to the operation of FIG. 1 except that now the characteristic response of an inductance is responsible for determining the length of the reference pulse and if the duration of the measured pulse is less than required the difference will be transmitted through the differential circuit 20 and diode 53 to the winding 54 of the transformer 55.

Although but a few embodiments of the present invention have been illustrated and described it will be apparent to those skilled in the art that various changes and modifications may be made therein without departing from the spirit of the invention or from the scope of the appended claims.

Having now particularly described and ascertained the nature of my said invention and the manner in which it is to be performed, I declare that what I claim is:

1. In combination a source of electrical pulses, means for transmitting these pulses along a plurality of channels, a pulse controlling circuit, said controlling circuit being connected to one of said channels for producing reference pulses of predetermined duration each starting at substantially the same time as a corresponding electrical pulse, detecting means for emitting a signal pulse equal to the difference in duration between a reference pulse and the corresponding electrical pulse, means for connecting the output of said controlling circuit to said detecting means for providing the reference pulses, and means for connecting said other of said channels to said detecting means for providing the electrical pulses.

2. In combination a source of electrical pulses, means for transmitting these pulses along a plurality of channels, a pulse shaping and phase inverting circuit, said pulse shaping and phase inverting circuit being connected to one of said channels for producing reference pulses of predetermined duration less than the duration of the pulses received, each of said reference pulses starting at substantially the same time as a corresponding electrical pulse, detecting means for emitting a pulse the shape of which is equal to the sum of a reference pulse and the corresponding electrical pulse, means for connecting the output of said pulse shaping and phase inverting circuit to said detecting means for providing the reference pulses, and means for connecting said other of said channels to said detecting means for providing the electrical pulses.

3. In combination a source of electrical pulses, means for transmitting these pulses along a plurality of channels, a pulse duration limiting and phase inverting circuit, said limiting and phase inverting circuit being connected to one of said channels for limiting said pulses to a predetermined value less than the duration of the pulses received, said limiting and phase inverting circuit comprising resistance and inductive components, means for detecting a variation in the duration of pulses, means for connecting the output of said pulse duration limiting and phase inverting circuit to said detecting means for providing a reference pulse of predetermined duration, and means for connecting said other of said channels to said detecting means for providing a source of variable pulses, said detecting means emitting a pulse the shape of which is equivalent to the difference in shape of said reference pulse and said variable pulses.

4. In combination a source of electrical pulses, means for transmitting these pulses along a plurality of channels, a pulse duration limiting and phase inverting circuit, said limiting and phase inverting circuit being connected to one of said channels for producing reference pulses of predetermined duration less than the duration of the pulses received, each of said reference pulses starting at substantially the same time as a corresponding electrical pulse, said limiting and phase inverting circuit comprising a monostable arrangement, detecting means for emitting a pulse the shape of which is equal to the difference in duration between a reference pulse and the corresponding electrical pulse, means for connecting the output of said pulse duration limiting and phase inverting circuit to said detecting means for providing the reference pulses, and means for connecting said other of said channels to said detecting means for providing the electrical pulses.

5. In combination a source of electrical pulses, means for transmitting these pulses along a plurality of channels, a pulse duration limiting and phase inverting circuit, said limiting and phase inverting circuit being connected to one of said channels for producing reference pulses of predetermined duration less than the duration of the pulses received, each of said reference pulses starting at substantially the same time as a corresponding electrical pulse, detecting means for emitting a pulse the width of which is equivalent to the difference in width of a reference pulse and the corresponding electrical pulse, means for connecting the output of said pulse duration limiting and phase inverting circuit to said detecting means for providing the reference pulses, and means for connecting said other of said channels to said detecting means for providing the electrical pulses.

References Cited in the file of this patent

UNITED STATES PATENTS

| | | |
|---|---|---|
| 2,484,352 | Miller et al. | Oct. 11, 1949 |
| 2,582,251 | Hoeppner | Jan. 15, 1952 |
| 2,634,346 | Hoeppner et al. | Apr. 7, 1953 |
| 2,668,236 | McCoy | Feb. 2, 1954 |
| 2,715,718 | Holtje | Aug. 16, 1955 |
| 2,830,263 | Shapiro | Apr. 8, 1958 |
| 2,975,366 | Young | Mar. 14, 1961 |